United States Patent [19]

Gish

[11] Patent Number: 5,163,343
[45] Date of Patent: Nov. 17, 1992

[54] SYSTEM FOR FASTENING PLIES OF FABRIC

[76] Inventor: Donald A. Gish, 3737 Lone Tree Way, Anitoch, Calif. 94509

[21] Appl. No.: 838,892

[22] Filed: Feb. 21, 1992

[51] Int. Cl.$^5$ ............................................... B25B 13/06
[52] U.S. Cl. ..................................... 81/120; 29/240.5; 81/125
[58] Field of Search ....................... 81/120, 121.1, 125, 81/44; 24/112, 706.2, 707.6, 710.3, 710.4, 704.1; 29/240, 240.5

[56] References Cited

U.S. PATENT DOCUMENTS

| | | | |
|---|---|---|---|
| 1,127,836 | 2/1915 | Whalen et al. | 81/120 |
| 3,602,975 | 9/1971 | Thurston et al. | 29/240.5 |
| 4,817,251 | 4/1989 | Shirley-Smith et al. | 24/112 X |

Primary Examiner—D. S. Meislin
Attorney, Agent, or Firm—Theodore J. Bielen, Jr.

[57] ABSTRACT

A system for fastening at least a pair of plies of fabric together utilizing a helical member having body portion of a certain pitch. The helical member also includes a sharpened tip and an end portion with a loop which lies in a plane which intersects the helical path of the helical member. A tool constructed with a gripping portion and a hollow portion connected to the same is employed to turn the helical member through the adjacent plies of fabric. The hollow portion is provided with a helical surface which is intended to contact the helical member. The pitch of the helical surface of the hollow member is opposite to that of the helical member.

4 Claims, 1 Drawing Sheet

SYSTEM FOR FASTENING PLIES OF FABRIC

BACKGROUND OF THE INVENTION

Cross references to related applications. The present invention is related to my copending application Ser. No. 685,735, filed Apr. 16, 1991, now abandoned.

The present invention relates to a system for holding at least a pair of plies of fabric together.

Floor coverings such as carpets are often protected in places by overlying coverings such as area rugs, mats, runners, and the like. In particular, floor mats used in vehicles are quite difficult to removabley secure due to the nature of usage and position of the protective mat within the vehicle. Moreover, gluing, riveting, and/or sewing tend to damage the underlying floor covering and prevent the easy removal of the overlain fabric mat when the same is worn or requires cleaning.

Prior art devices have included the usage of helical fasteners which are normally used to attach buttons, buckles, and clasps to clothing. Such prior art devices necessarily require that a portion of the device in the form of a button head remain outside the fabric. Unfortunately, such prior art devices are also difficult to remove without the existence of the protruding button or clasp attached to the fastening device.

A fastening system for multiple plies of fabric which solves the problems found in the prior art would be a notable advance in the field of surface coverings.

SUMMARY OF THE INVENTION

In accordance with the present invention, a novel and useful system for holding multiple plies of fabric together is herein described.

The system of the present invention utilizes a helical member which traces a helical path at a certain pitch. The helical member includes a first end having a sharpened tip and a second end with a loop portion. The loop portion lies in a plane which intersects the helical path. Normally, the loop portion would then lie flush with a surface of a ply of fabric and, thus, present an unobtrusive profile relative to the fabric. If the fabric exhibits a degree of plushness, the looped portion would lie within the plush material. The loop portion of the second end of the helical member may take the form of an open or closed loop.

The sharpened tip of the first end of the helical member may posses a first portion extending along the helical path and a second beveled portion joining the first portion to form a sharpened tip. In this manner, the sharpened tip bites or digs into the fabrics and generally follows the helical path of the helical member when traveling through the fabrics when joining fabric plies together.

The system of the present invention also entails a tool constructed with a gripping portion and a hollow portion connected to the gripping portion. The hollow portion includes a helical surface which is intended to contact the helical member. The pitch of the helical surface of the hollow member is opposite to the pitch of the helical member itself. The helical surface of the hollow member may lie inside an open chamber of the hollow portion of the tool. The gripping portion of the tool may take the form of a flange which is easily graspable by the user. The helical member may be driven into and out of multiple plies of fabric by the tool, which is itself easily removable from the helical member between right-hand engagement and left-hand engagement of the helical member.

It may be apparent that a novel and useful system for holding multiple plies of fabric together has been hereinabove described.

It is therefore an object of the present invention to provide a system for removably holding multiple plies of fabric together which is relatively simple to use and employs a fastener which is removable, thus permitting the multiple plies of fabric to be removably fastened to one another.

It is another object of the present invention to provide a system for removably holding multiple plies of fabric together which employs a helical member as a removably fastenable element of the system that is not prominent after fastening of the multiple plies of fabric have taken place.

Yet another object of the present invention is to provide a system for removably holding multiple plies of fabric together which includes a tool member that may be employed to drive a fastener through the multiple plies of fabric and may be removed from the multiple plies of fabric in a simple and convenient manner.

A further object of the present invention is to provide a system for removably holding multiple plies of fabric together which renders mats and area carpets safe against potentially injury causing slippage relative to an underline fabric covering.

The invention possesses other objects and advantages especially as concerns particular characteristics and features thereof which will become apparent as the specification continues.

BRIEF DESCRIPTION DRAWINGS

Figure 1:
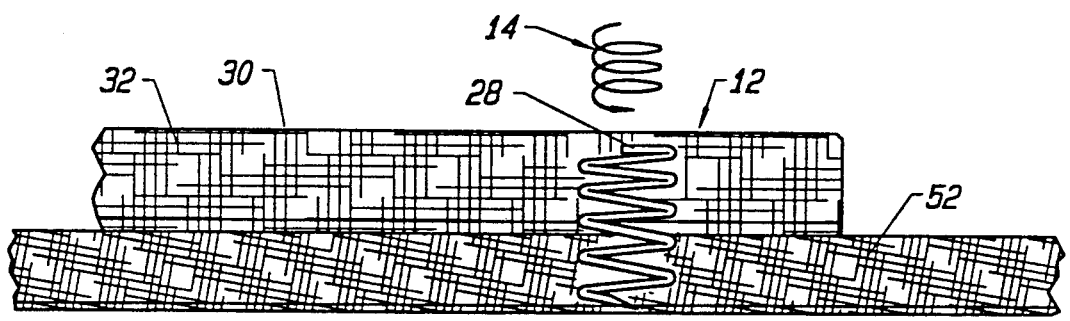
FIG. 1 is a partial sectional view showing the fastening member of the present invention in place between a pair of plies of fabric.

For a better understanding of the invention reference is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof which should be taken together with the hereinabove described drawings.

The invention as a whole is shown in the drawings by reference character 10. The fastening system 10 includes as one of its elements a helical member 12 which traces a helical path 14, depicted schematically in FIG. 1. As depicted in the drawings, the helical path 14 is a left-hand path when viewed from the top of the drawing page. Helical member 12 includes a first end 16 having a sharpened tip 18. Sharpened tip 18 possesses a first portion 20 which extends along the helical path 14 or parallel to helical path 14. Second portion 22 of sharpened tip 18 is angled or beveled relative to first portion 20. Together, first and second portions 20 and 22 of sharpened tip 18 converge in the formation of the sharpened tip 18. Thus, tip 18 is beveled toward second portion 20, FIG. 2A.

Figure 2:
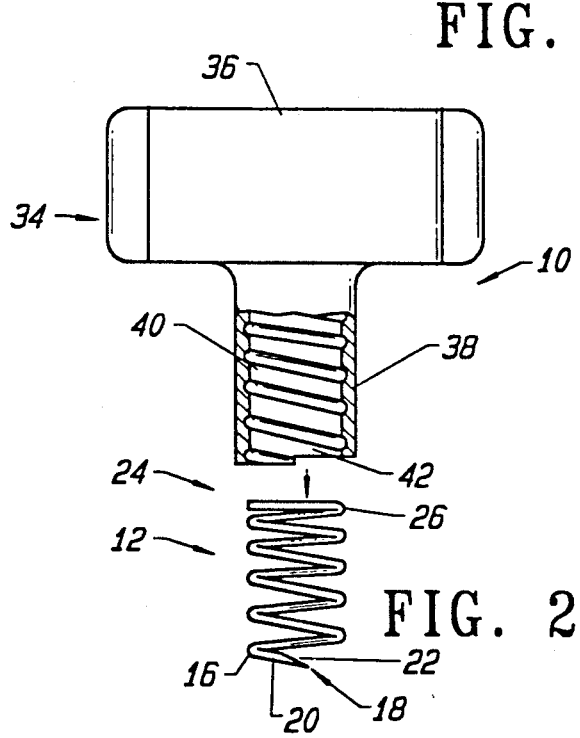
FIG. 2 is a front elevational view of the system of the present invention with a portion of the tool hollow portion in section.
Figure 2A:
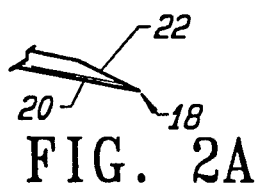
FIG. 2A is a side elevational view of the beveled tip of the helical member of the present invention.
Figure 3:
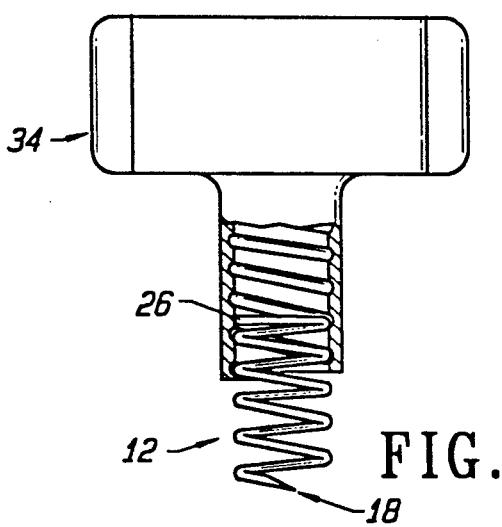
FIG. 3 is a front elevational view of the system of the present invention with a tool hollow portion in section and the fastening member depicted engaging the helical inner surface of the hollow portion of the tool.

Helical member 12 also possesses a second end 24 which terminates in a loop 26 depicted in FIG. 2 as a closed loop. Loop 26 intersects helical path 14. With reference to FIG. 1, it may be observed that second end 24 includes an open loop 28 which also intersects helical path 14 at a certain angle. Closed and open loops 26 and 28 generally lie parallel to the outer surface of the fastened ply, such as outer surface 30 of fabric ply 32, FIG. 1.

System 10 also encompasses a tool 34 consisting of a gripping portion 36 and a hollow portion 38, which is formed integrally with gripping portion 36 or connected thereto. Hollow portion 38 is constructed with a helical surface 40, best shown in FIG. 2, possessing a pitch opposite to the pitch of helical member 12. In other words, the pitch of helical surface 40 has a right-hand pitch and lies within chamber 42 of hollow portion 38.

Figure 5:
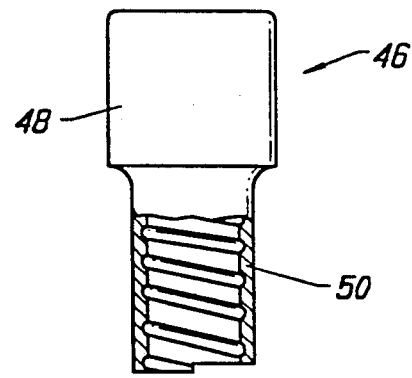
FIG. 5 is another embodiment of the tool portion of the system of the present invention with the hollow portion of the tool depicted in section.

It should be noted that gripping portion 36 of tool 34 includes a plurality of ridges or flanges 44 which aid in the gripping process. With reference to FIG. 5, it may be observed that tool 46 is depicted having gripping portion 48 of cylindrical configuration connected to hollow portion 50.

Figure 4:
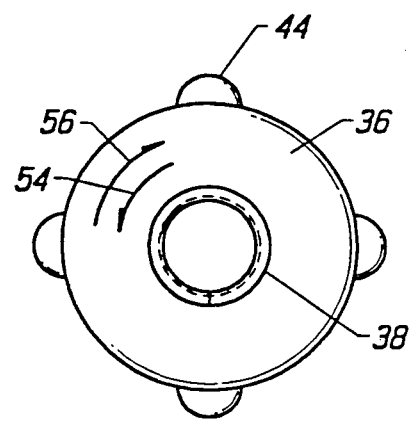
FIG. 4 is a bottom plan view of the system depicted in FIG. 3.

In operation, the user places fabric ply 32 over fabric ply 52 for the purpose of fastening fabric ply 32 to fabric ply 52. Additional fabric plies may be fastened together, but two plies are shown for the purpose of illustration. Helical member 12 is then driven through surface 30 of ply 32 along helical path 14. The particular bevel of sharpened tip 18 greatly aids in this endeavor. It has been found that tips of other configurations fail to permit the driving of helical member through the fabric plies 32 and 52. Second end 24 of helical member 12 is engaged by helical surface 40 within hollow portion 38 of tool 34. Turning the tool gripping portion 36 counter clockwise, directional arrow 54 of FIG. 4, drives helical member through plies 32 and 52 and into the position depicted in FIG. 1. It should be noted that second end 24 of helical member 12, in the form of a closed or open loop 26 or 28, may lie flush with outer surface 30 of ply 32 or slightly below outer surface 30. The latter is especially true where outer surface 30 of fabric ply 32 is composed of plush material. Thus, first end 16 of helical member 12 is safely hidden within ply 52 while second end 24 is unobtrusive relative to outer surface 30 of first ply 32. The length of helical member may vary in this regard. Helical member 12 may be easily removed from the position depicted in FIG. 1 by again engaging the helical surface 40 of hollow portion 38 with second end 24 of helical member 12. Turning gripping portion 36, FIG. 4, in a clockwise direction, directional arrow 56, again engages helical member 12 and effects removal of the same from plies 32 and 52. It has been found that tool 34 may be turned about one quarter of a turn along directional arrows 54 or 56 to either engage helical member 12 for the purposes of fastening or unfastening the same. Tool 34 is easily disengaged from helical member between such engagements with helical member 12.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is

1. A system for removably holding at least a pair of fabric plies together comprising:
  a. a helical member, tracing a helical path at a certain pitch, said helical member having a first end including a sharpened tip and a second end with a loop portion lying in a plane intersecting the helical path; and
  b. a tool including a gripping portion and a hollow portion connected to said gripping portion, said hollow portion including a helical surface intended to contact the helical member, said pitch of said helical surface being the opposite of said pitch of said helical member.

2. The system of claim 1 in which said loop portion of said second end of said helical member is a closed loop.

3. The system of claim 2 in which said sharpened tip of said first end of said helical member includes a first portion extending along said helical path, and a second helical portion joining said first portion to form said sharpened tip.

4. The system of claim 2 in which said tool gripping portion includes a flange extending outwardly from said hollow portion.

* * * * *